United States Patent [19]

Maeda

[11] 3,873,766

[45] Mar. 25, 1975

[54] AUTOMATIC HORIZONTAL FREQUENCY CONTROL CIRCUITS FOR TELEVISION RECEIVERS

[75] Inventor: Akira Maeda, Chigasaki, Japan

[73] Assignee: Sony Corporation, Tokyo, Japan

[22] Filed: Feb. 13, 1974

[21] Appl. No.: 441,937

[30] Foreign Application Priority Data

Feb. 20, 1973 Japan .............................. 48-20531

[52] U.S. Cl. ...................... 178/7.3, 331/17, 331/20, 178/69.5 TV

[51] Int. Cl. ........................................ H04b 1/16

[58] Field of Search ....... 178/7.3 R, 7.5 R, 69.5 TV, 178/5.8 AF; 325/418–423; 360/26, 36; 331/20, 26, 17

[56] References Cited

UNITED STATES PATENTS 3,591,716 7/1971 Sirka ...................... 178/69.5 TV X 3,730,989 5/1973 Rhee ............................. 178/7.5 R 3,758,711 9/1973 Crosno ............................. 360/36

*Primary Examiner*—Richard Murray

*Assistant Examiner*—Aristotelis M. Psitos

*Attorney, Agent, or Firm*—Lewis H. Eslinger; Alvin Sinderbrand

[57] ABSTRACT

An automatic horizontal frequency control circuit for a television receiver suitable for monitoring an image of a video signal reproduced by a video tape recorder, in which a horizontal oscillator is controlled in its frequency with a control signal produced by a variable time constant circuit which is supplied with a signal obtained as a result of comparison of a horizontal synchronous signal with a horizontal output pulse. The time constant of the time constant circuit during a vertical blanking period is shortened as compared with the time constant during other periods, thereby to compensate for a skew distortion in the image caused by the time errors of the reproduced video signal from the video tape recorder within the vertical blanking period.

7 Claims, 2 Drawing Figures

AUTOMATIC HORIZONTAL FREQUENCY CONTROL CIRCUITS FOR TELEVISION RECEIVERS

BACKGROUND OF THE INVENTION

1. Field of the Invention

This invention relates generally to a television receiver, and more particular to an automatic horizontal frequency control circuit for a television receiver suitable for monitoring an image of a video signal reproduced from a video tape recorder.

2. Description of the Prior Art

It is known to use a conventional television receiver for monitoring an image of a video signal reproduced from a video tape recorder which will be hereinafter referred to as VTR. However, in a conventional television receiver the time constant of an automatic frequency control (which will be hereinafter referred to as AFC) circuit used in a horizontal circuit is selected relatively long for avoiding an influence of noise signals induced from an antenna, so that when the television receiver is used as a video monitor for the VTR, the interval time error of a reproduced signal can not be compensated for in a vertical blanking period and then a skew distortion occurs in a reproduced picture. That is, when the image of a reproduced video signal from VTR is monitored by a television receiver which has its object to receive a video signal transmitted by a broadcasting station, due to mechanical causes such as the expansion and contraction of a video tape used in VTR, the deformation of a head drum, the unequality in rotating velocity of a rotating head and the like, the time period in each field of the reproduced video signal can not be made constant. For this reason, immediately after the head of VTR is switched (in general, the switching of the head is performed at the lower portion of the reproduced picture, for example, before five horizontal periods of a vertical blanking period), the time error compensation by the AFC circuit becomes incomplete temporarily and consequently the reproduced picture is curved into the left or right hand side at its upper portion to produce a skew distortion.

In order to avoid the generation of such a skew distortion in a reproduced picture, it may be considered that the time constant of the AFC circuit is shortened to compensate for the skew distortion within the vertical blanking period. However, if the time constant of the AFC circuit is shortened, in the case of receiving a broadcasted video signal, it is made apt to be affected by an external noise signal and consequently the disturbance of synchronization by the noise pulse may appear in the reproduced picture.

To avoid this, the AFC circuit employed in a conventional television receiver for reproducing the video signal from the VTR is set to have a time constant between the time constant suitable for receiving the video signal transmitted from the braodcasting station and the time constant suitable for monitoring the video signal reproduced from the VTR. As a result, the AFC circuit used in the prior art television receiver can not show sufficient characteristics as a television receiver for receiving the braodcasted video signal nor as a monitor television for reproducing the video signal from the VTR.

SUMMARY OF THE INVENTION

This invention provides an automatic frequency control circuit for a television receiver which can monitor the image reproduced from a video signal which is reproduced from a VTR without any distortion.

With this invention, a skew distortion caused by the time error of reproduced video signals is compensated within a vertical blanking period by shortening the time constant of an automatic frequency control circuit used in a horizontal circuit during a vertical blanking period.

It is an object of this invention to provide a television receiver which can monitor the image of a reproduced video signal from a VTR without any skew distortion.

Another object of this invention is to provide an automatic frequency control circuit for the horizontal circuit of a television receiver.

Still another object of this invention is to provide a variable time constant circuit for an automatic frequency circuit in which the time constant of a variable time constant circuit is shortened during a vertical blanking period of a video signal.

The additional and other objects, features and advantages of this invention will be apparent from the following description taken in conjunction with the accompanying drawings.

DESCRIPTION OF THE PREFERRED EMBODIMENT

Figures 1, 2:
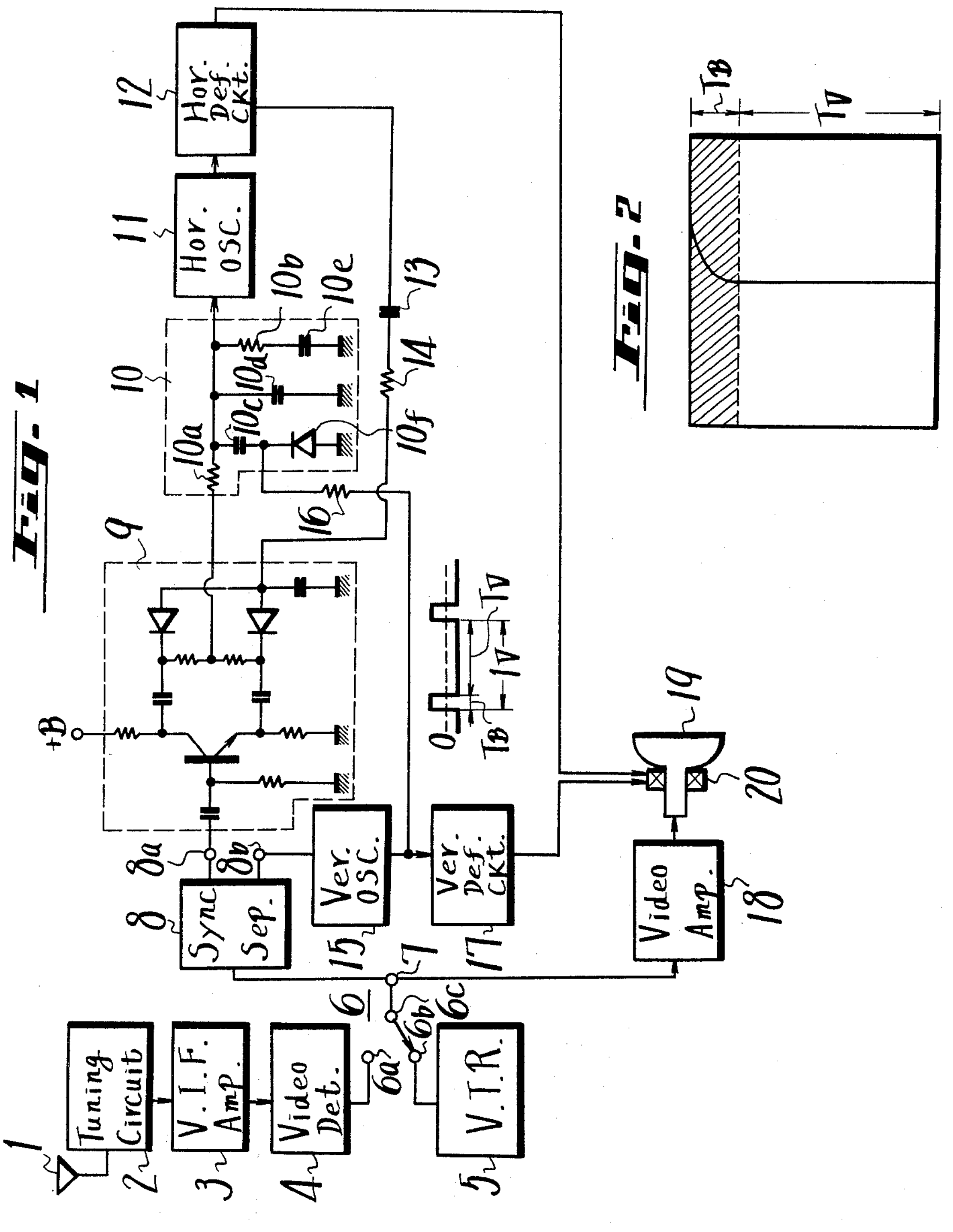
FIG. 1 shows a schematic circuit diagram of a television receiver in which an automatic frequency control circuit according to this invention is provided.
FIG. 2 shows a reproduced picture on a cathode ray tube of the television receiver of FIG. 1.

FIG. 1 shows a television receiver in which an automatic frequency control circuit according to this invention is used.

With the television receiver shown in FIG. 1, a broadcasted television signal is received by an antenna 1 converted by a tuning circuit 2 into a signal with a predetermined video intermediate frequency, and then fed to a video intermediate frequency (which will be hereinafter referred to as VIF) amplifier 3. The output signal of the VIF amplifier 3 is applied to a video detector 4 to be detected the detected output signal of which is delivered to a fixed contact 6*a* of a switch 6. The output signal of a VTR 5 is delivered to a fixed contact 6*b* of the switch 6.

When a movable contact 6*c* of the switch 6 contacted with its fixed contact 6*a*, the broadcasted video signal is fed to a video signal input terminal 7, while when the movable contact 6*c* is contacted with a fixed contact 6*b*, the video signal reproduced from the VTR 5 is fed to the video signal input terminal 7. The video signal fed to the input terminal 7 is applied to a synchronous (sync) separator 8 and also through a video amplifier 18 to a cathode ray tube 19. A horizontal sync signal is obtained at a horizontal sync signal output terminal 8*a* of the sync separator 8, while a vertical sync signal is obtained at a vertical sync signal output terminal 8*b* of the sync separator 8. The horizontal sync signal obtained at the terminal 8*a* is applied to a phase comparator 9 and therein compared with a horizontal pulse. The compared output signal of the phase comparator 9 is applied through a variable time constant circuit 10 to a horizontal oscillator 11.

The variable time constant circuit 10 consists of resistors 10*a*, 10*b*, capacitors 10*c*, 10*d*, 10*e* and a diode 10*f*. In this case, the resistors 10*a*, 10*b* and capacitors 10*d*, 10*e* form a first time constant circuit the time constant of which is shortened by such an extent that a skew distortion caused during reproduction of the video signal from the VTR 5 can be compensated for within the vertical blanking period 1V, for example, one horizontal period to 10 horizontal period, while, the resistors 10*a*, 10*b* and capacitors 10*c*, 10*d*, 10*e* form a second time constant circuit the time constant of which is, on the contrary, extended to such an amount that, during reception of the broadcasted video signal, the disturbance of synchronization is not caused in a reproduced picture by the external noise signal, for example, 10 horizontal periods to 20 horizontal periods. However, it is preferred that the time constant of the first time constant circuit is selected smaller than a half of the time constant of the second time constant circuit.

The output signal of the horizontal oscillator 11 is applied to a horizontal deflecting circuit 12 the output of which is fed to the horizontal deflecting coil of a deflecting device 20 and also to the phase comparator 9 through a capacitor 13 and a resistor 14 as the horizontal pulse. The vertical sync signal obtained at the vertical sync signal output terminal 8*b* is fed to a vertical oscillator 15 the output signal of which is applied to the vertical deflecting coil of the deflecting device 20 through a vertical deflecting circuit 17 and to the connection point between the capacitor 10*c* and the diode 10*f* of the time constant circuit 10 through a resistor 16.

With this invention constructed as above, the time constant of the time constant circuit 10 is shortened during the vertical blanking period, that is, since the diode 10*f* is made conductive by the output signal of the vertical oscillator 15 during a video period $T_V$, the capacitor 10*c* is connected in parallel to the capacitor 10d to make the time constant of the time constant circuit 10 long during the video period. While, during a vertical blanking period $T_B$, since the diode 10*f* is made nonconductive, the time constant of the time constant circuit 10 is made short.

As described above, with the invention the time constant of the AFC circuit is shortened during the vertical blanking period $T_B$, so that the skew distortion is compensated for during the vertical blanking period $T_B$ and hence the skew distortion does not appear in the reproduced picture as shown in FIG. 2. In this case, the retrace time of the vertical deflecting circuit 17 is assumed as zero.

Further, in this invention since the time constant of the AFC circuit is comparatively extended in the time period other than the vertical blanking period $T_B$, during such a period or the video period the external noise has substantially no influence and consequently any disturbance of synchronization does not appear in the reproduced picture.

Consequently, the television receiver of the present invention can be used as a monitor television receiver for reproducing a picture from the video signal of the VTR, and also for reproducing a picture from the video signal of the broadcasted televsion signal without the disturbance of synchronization due to the external noise.

In the illustrated embodiment, the capacitor 10*c* is changeably connected to the capacitor 10*d* by the switching diode 10*f* to change the time constant of the time constant circuit 10, but it may be also possible that the resistors 10*a* and 10*b* are varied in value to change the time constant.

Further, it may be also possible to supply to the switching diode 10*f* the switching pulse from the sync separator 8 or the vertical deflecting circuit 17.

Further, in the illustrated embodiment, the broadcasted television signal and the reproduced video signal from the VTR are switched at the video frequency, but it may be possible that they are switched at the radio frequency or intermediate frequency.

The foregoing description is made on a single preferred embodiment only, but it will be apparent that many modifications and variations could be made by those skilled in the art without departing from the spirits and scope of the novel concepts of the present invention. Therefore, the scope of the invention should be determined by the appended claims only.

I claim as my invention:

1. An automatic horizontal frequency control circuit for a television receiver comprising:

a. oscillator means for producing a horizontal frequency signal;

b. horizontal output circuit means connected to said oscillator means for producing a horizontal pulse in response to said horizontal frequency signal;

c. phase comparator means connected to be supplied with a horizontal sync signal in a video signal and said horizontal pulse for comparison and producing an output signal varying in response to the result of the comparison;

d. variable time constant circuit means connected between said phase comparator means and said oscillator means for producing a frequency control signal for said oscillator means from said output signal of said phase comparator means, said variable time constant circuit means having variable time constant; and e. control circuit means connected to said variable time constant circuit means for controlling it so as to have a first time constant and a second time constant during a vertical blanking period and other periods, respectively, said first time constant being shorter than said second time constant.

2. An automatic horizontal frequency control circuit according to claim 1, wherein said variable time constant circuit means comprises at least two time constant components each having different time constants, one of said time constant components being connected selectively to be operated by said control circuit means.

3. An automatic horizontal frequency control circuit according to claim 2, wherein said one of time constant components includes switch means controlled in its conductivity by said control means.

4. An automatic horizontal frequency control circuit according to claim 3, wherein said one of time constant components comprises a series connection of a capacitor and a diode provided in parallel to the other of said time constant components, said diode being made nonconductive only during the vertical blanking period by said control means.

5. An automatic horizontal frequency control circuit for a television receiver according to claim 1, further comprising a sync separator means for generating said horizontal sync signal and a vertical sync signal, and said horizontal sync signal being supplied to said phase comparator means.

6. An automatic horizontal frequency control circuit for a television receiver according to claim 5, further comprising a vertical oscillator means connected to said sync separator means and receiving said vertical sync signal therefrom, and a vertical output circuit means connected to said vertical oscillating means.

7. An automatic horizontal frequency control circuit according to claim 5, wherein a control signal in response to said vertical sync signal is supplied to said control circuit means.

* * * * *